(12) United States Patent
Andersson et al.

(10) Patent No.: US 11,483,555 B2
(45) Date of Patent: Oct. 25, 2022

(54) MULTIPLE BOUNDARY FILTERING

(71) Applicant: Telefonaktiebolaget LM Ericsson (publ), Stockholm (SE)

(72) Inventors: Kenneth Andersson, Gävle (SE); Rickard Sjöberg, Stockholm (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 805 days.

(21) Appl. No.: 16/323,875

(22) PCT Filed: Dec. 13, 2018

(86) PCT No.: PCT/EP2018/084694
§ 371 (c)(1),
(2) Date: Feb. 7, 2019

(87) PCT Pub. No.: WO2019/137730
PCT Pub. Date: Jul. 18, 2019

(65) Prior Publication Data
US 2021/0360237 A1    Nov. 18, 2021

Related U.S. Application Data

(60) Provisional application No. 62/616,143, filed on Jan. 11, 2018.

(51) Int. Cl.
*H04N 19/86* (2014.01)
*H04N 19/117* (2014.01)
(Continued)

(52) U.S. Cl.
CPC ......... *H04N 19/117* (2014.11); *H04N 19/159* (2014.11); *H04N 19/176* (2014.11); *H04N 19/86* (2014.11)

(58) Field of Classification Search
None
See application file for complete search history.

(56) References Cited

U.S. PATENT DOCUMENTS 10,448,011 B2 * 10/2019 Liu ........................ H04N 19/46
2006/0133689 A1    6/2006 Andersson et al.
(Continued)

FOREIGN PATENT DOCUMENTS

EP    0 917 357 A1    5/1999
EP    2 665 274 A1    11/2013

OTHER PUBLICATIONS

International Search Report and Written Opinion issued in International Application No. PCT/EP2018/084694, dated Mar. 6, 2019, 20 pages.
(Continued)

*Primary Examiner* — Mohammad J Rahman
(74) *Attorney, Agent, or Firm* — Rothwell, Figg, Ernst & Manbeck, P.C.

(57) ABSTRACT

A method performed by a device for filtering a current block adjacent to an upper block and a left block is provided. The method includes (1) filtering a first sample located in a top-left area of the current block using (i) at least one sample from the upper block above the top-left area, (ii) at least one sample from the left block, and (iii) at least one unfiltered sample value for the first sample; (2) filtering a second sample located in a top-right area of the current block using (i) at least one sample from the upper block and (ii) at least one unfiltered sample value for the second sample; and (3) filtering a third sample located in a bottom-left area of the current block using (i) at least one sample from the left block and (ii) at least one unfiltered sample value for the third sample.

18 Claims, 9 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 2013/0034153 A1* | 2/2013 | Song | | H04N 19/615 |
| | | | | 375/240.03 |
| 2014/0241428 A1* | 8/2014 | Sato | | H04N 19/30 |
| | | | | 375/240.12 |
| 2015/0110174 A1* | 4/2015 | Gu | | H04N 19/157 |
| | | | | 375/240.03 |
| 2017/0272745 A1* | 9/2017 | Liu | | H04N 19/157 |
| 2017/0353719 A1* | 12/2017 | Liu | | H04N 19/176 |
| 2017/0353730 A1* | 12/2017 | Liu | | H04N 19/11 |
| 2018/0295361 A1* | 10/2018 | Kim | | H04N 19/82 |
| 2019/0149822 A1* | 5/2019 | Kim | | H04N 19/12 |
| | | | | 375/240.02 |
| 2019/0200016 A1* | 6/2019 | Jang | | H04N 19/86 |
| 2019/0208209 A1* | 7/2019 | Jang | | H04N 19/117 |
| 2020/0045322 A1* | 2/2020 | Ye | | H04N 19/159 |
| 2021/0160487 A1* | 5/2021 | Kim | | H04N 19/147 |

OTHER PUBLICATIONS

Norkin, A. et al., "HEVC Deblocking Filter", IEEE Transactions on Circuits and Systems for Video Technology, vol. 22, No. 2, Dec. 2012, 9 pages.

Drugeon, V., "EE1: Crosscheck of test 1", Joint Video Exploration Team (JVET) of ITU-T SG 16 WP 3 and ISO/IEC JTC 1/SC 29/WG 11, 8th Meeting: Macao, CN, Oct. 18-24, 2017, 2 pages.

Sjöberg, R. et al., "Description of SDR and HDR video coding technology proposal by Ericsson and Nokia", Joint Video Exploration Team (JVET) of ITU-T SG 16 WP 3 and ISO/IEC JTC 1/SC 29/WG 11, 10th Meeting: San Diego, CA, USA, Apr. 10-20, 2018, 32 pages.

* cited by examiner

MULTIPLE BOUNDARY FILTERING

CROSS REFERENCE TO RELATED APPLICATION(S)

This application is a 35 U.S.C. § 371 National Stage of International Patent Application No. PCT/EP2018/084694, filed Dec. 13, 2018, designating the United States and claiming priority to U.S. provisional application No. 62/616,143, filed on Jan. 11, 2018. The above identified applications are incorporated by reference.

TECHNICAL FIELD

Disclosed are embodiments for multiple boundary filtering for video coding.

BACKGROUND

A video sequence comprises a sequence of images where each image comprises one or more components. Each component can be described as a two-dimensional rectangular array of sample values. It is common that an image in a video sequence consists of three components: one luma component (Y) where the sample values are luma values and two chroma components (Cb and Cr) where the sample values are chroma values. It is common that the dimensions of the chroma components are smaller than the luma components by a factor of two in each dimension. For example, the size of the luma component of an HD image may be 1920×1080 and the chroma components may each have a size of 960×540. Components are sometimes referred to as color components.

A block is one two-dimensional array of samples. In video coding, each component (a.k.a. color component) of an image is split into blocks and the coded video bitstream may therefore comprise a sequence of blocks. It is common in video coding that an image is split into units that cover a specific area of the image. Each unit comprises all blocks that make up that specific area and each block belongs fully to one (and only one) unit. The macroblock in H.264 and the Coding unit (CU) in HEVC are two examples of units.

A block may refer to a two-dimensional array that a transform used in coding is applied to. These blocks are known under the name "transform blocks". Alternatively, a block may refer to a two-dimensional array that a single prediction mode is applied to. These blocks can be called "prediction blocks". As used throughout this disclosure, the word block encompasses at least transform blocks and prediction blocks. Blocking artifacts can occur at both prediction block boundaries and transform block boundaries.

There are generally two types of prediction: inter prediction and intra prediction. Inter-prediction predicts blocks of the current picture using samples coming from previously decoded pictures. Intra-prediction predicts blocks of the current picture using samples coming from the current picture.

A residual block comprises samples that represents the sample value difference between the samples of an original source block and a corresponding prediction block. The residual block may be processed using a spatial transform. The transform coefficients are then quantized according to a quantization parameter (QP) which controls the precision of the quantized coefficients. The quantized coefficients can be referred to as residual coefficients. A high QP would result in low precision of the coefficients and thus low fidelity of the residual block. A decoder then receives the residual coefficients, applies inverse quantization and inverse transform to derive the residual block. Reconstruction of the block is then done by adding samples of the decoded residual block and samples of the corresponding prediction block.

After blocks have been reconstructed, deblocking is applied to reduce boundaries between blocks.

In HEVC and JEM, for example, deblocking is first applied on vertical boundaries and then on horizontal boundaries. The boundaries are either transform block boundaries or prediction block boundaries. To enable parallel-friendly deblocking, the deblocking may be performed on an 8×8 sample grid.

A deblocking filter strength parameter (bs) is set for each boundary. If the value of bs is larger than 0, then deblocking may be applied. The larger the boundary strength is, the stronger filtering is applied. First, it is checked if any of the blocks at a boundary between the blocks is an intra coded block; if so, then the parameter bs is set to 2. Otherwise, if both blocks use inter prediction and some condition is met (e.g., both blocks use different reference frames or have significant different motion vectors or if a residual is coded), then the parameter bs is set to 1. To avoid removing natural structures when deblocking, a check that there are not any natural structures on respective side of the boundary may then be applied for luma. In HEVC, gradient calculations are used on respective sides of the boundary using the following inequality: $|p_0-2p_1+p_2|+|q_0-2q_1+q_2|<\beta$, where $\beta$ is a parameter based on the quantization parameter for the block and $p_0, p_1, p_2$ are samples on one side of the block boundary and $q_0, q_1, q_2$ are samples on the other side of the block boundary. The condition is checked at two positions along the boundary and if both checks are fulfilled then the luma samples are deblocked for that 4 sample part of the boundary. Chroma boundaries are always filtered if any one of the neighbouring blocks are intra coded.

In the exploration software for future video coding in JVET there is a tool called PDPC that combines intra prediction of the current block using planar mode with a weighted combination of reconstructed samples just outside the current block. The general idea is to do an intra prediction of the current block based on filtered reconstructed samples just outside the current block and then make a weighted combination of that with unfiltered reconstructed samples just outside the current block. Using unfiltered reconstructed samples just outside the block can improve the fidelity of the intra prediction.

FIG. 1 shows an example of intra prediction in 4×4 blocks, with notation for unfiltered and filtered reference samples. Such intra prediction is described in Algorithm Description of Joint Exploration Test Model 7 (JEM 7) JVET-G1001. The notation used to define PDPC is shown in FIG. 1. In FIG. 1, r and s represent the boundary samples with unfiltered and filtered references, respectively. Likewise, q[x,y] is the HEVC style intra prediction (only planar mode in the JEM) based on filtered reference boundary samples s. x and y are the horizontal and vertical distance from the block boundary.

The prediction p[x,y] combines weighted values of boundary elements with q[x,y] as follows:

$$p[x,y]=\{(c_1^{(v)}>>\lfloor y/d_y \rfloor)r[x,-1]-(c_2^{(v)}>>\lfloor y/d_y \rfloor)r[-1,-1]+(c_1^{(h)}>>\lfloor x/d_x \rfloor)r[-1,y]-(c_2^{(h)}>>\lfloor x/d_x \rfloor)r[-1,-1]+b[x,y]q[x,y]+64\}>>7$$

where $c_1^{(v)}, c_2^{(v)}, c_1^{(h)}, c_2^{(h)}$ are stored prediction parameters, $d_x=1$ for blocks with width smaller than or equal to 16 and $d_x=2$ for blocks with width larger than 16; $d_y=1$ for blocks with height smaller than or equal to 16 and $d_y=2$ for blocks with height larger than 16. The operator >> represents a right shift bitwise operation. b[x, y] is a normalization factor derived as follows:

$$b[x,y]=128-(c_1^{(v)}>>\lfloor y/d_y \rfloor)+(c_2^{(v)}>>\lfloor y/d_y \rfloor)-(c_1^{(h)}>>\lfloor x/d_x \rfloor)+(c_2^{(h)})>>\lfloor x/d_x \rfloor)$$

The stored prediction parameters (weights) are specific for width and height of the prediction block.

SUMMARY

One problem with techniques that smooth prediction boundaries is that they can introduce boundaries inside the prediction block which can cause deblocking filtering to not be used since the boundary may be treated as a natural structure. Another problem is that PDPC filters all samples of the prediction block.

One problem with only deploying deblocking first on vertical boundaries and then on horizontal boundaries is that the second filtering across horizontal boundaries will result in a stronger filtering effect of the end result in the overlapping area of the two filterings.

Embodiments are provided for addressing one or more of these problems. For example, embodiments perform filtering of an overlap area (e.g. the top-left corner of a block) with a filter that depends both on samples from the neighboring blocks to the left of and above the current block, in addition to samples of the current block. Embodiments may also only filter perpendicular to the boundary of the non-overlap area (e.g. top-right and bottom-left region of the block), with a filter that depends only on samples from a block above the current block (e.g. for top-right region) or a block to the left of the current block (e.g. for bottom-left region), in addition to samples from the current block. Further, in some embodiments, the filtering is performed with filters that produce a linear decay with distance from a boundary, e.g. to avoid introducing edges inside the block. Embodiments also use other forms of decay (e.g., non-linear decay).

According to a first aspect, a method performed by a device (e.g., encoder, decoder) for filtering a current block adjacent to an upper block (a.k.a. above block) and a left block is provided. The method includes determining to apply filtering to both a top boundary and a left boundary of the current block. The method further includes, in response to determining to apply filtering to both the top boundary and the left boundary of the current block, filtering a first sample located in a top-left area of the current block using (i) at least one sample from the upper block above the top-left area of the current block, (ii) at least one sample from the left block to the left of the top-left area of the current block, and (iii) at least one unfiltered sample value for the first sample; filtering a second sample located in a top-right area of the current block using (i) at least one sample from the upper block above the top-right area of the current block and (ii) at least one unfiltered sample value for the second sample; and filtering a third sample located in a bottom-left area of the current block using (i) at least one sample from the left block to the left of the bottom-left area of the current block and (ii) at least one unfiltered sample value for the third sample.

In embodiments, filtering samples in the top-left, top-right, and bottom-left areas of the current block is performed such that there is a smooth transition from filtering in the top-left area of the current block (e.g., overlap area) and the top-right and bottom-left areas of the current block (e.g., non-overlap areas), such that filtering the first sample in the top-left area of the current block is based on (i) filtering performed in the bottom-left area of the current block and a distance of the first sample from the bottom-left area of the current block, and (ii) filtering performed in the top-right area of the current block and a distance of the first sample from the top-right area of the current block. In embodiments, filtering samples in the top-left, top-right, and bottom-left areas of the current block results in a filter strength with linear decay with distance from a block boundary. In embodiments, filter coefficients decay as $2^{-d}$ for a distance d from a vertical or horizontal boundary. In embodiments, the current block is a prediction block, and determining to apply filtering to both a top boundary and a left boundary of the current block is based at least in part on the current block being a prediction block. In embodiments, the current block uses planar prediction or DC prediction, and determining to apply filtering to both a top boundary and a left boundary of the current block is based at least in part on the use of planar prediction or DC prediction. In embodiments, the method further includes selecting between a strong filter and a weak filter based on whether neighboring blocks comprise residual coefficients and/or whether the current block is using a non-separable secondary transform (NSST) or not. The selection between using a "strong filter" or a "weak filter" can alternatively be based on the Quantization Parameter (QP), such that a strong filter is used for higher QPs than for lower QPs. In embodiments, the current block is a prediction block and the filtering of the top-left, top-right, and bottom-left areas is applied on the current block as part of an intra prediction process, and determining to apply filtering to both a top boundary and a left boundary of the current block is based at least in part on the intra prediction process. In embodiments, a strong filter comprises a filter that puts more weight on values of neighboring blocks, and a weak filter comprises a filter that puts more weight on values of the current block. In embodiments, one or more of: (i) the at least one sample from the upper block above the top-left area of the current block and the at least one unfiltered sample value for the first sample are located in the same sample column; (ii) the at least one sample from the left block to the left of the top-left area of the current block and the at least one unfiltered sample value for the first sample are located in the same sample row; (iii) the at least one sample from the upper block above the top-right area of the current block and the at least one unfiltered sample value for the second sample are located in the same sample column; and (iv) the at least one sample from the left block to the left of the bottom-left area of the current block and the at least one unfiltered sample value for the third block are located in the same sample row.

According to a second aspect, a device (e.g., encoder or decoder) being adapted to perform the steps of any one of the embodiments of the first aspect is provided.

According to a third aspect, a device (e.g., encoder or decoder) configured for filtering a current block adjacent to an upper block and a left block is provided. The device includes a determining module configured to determine to apply filtering to both a top boundary and a left boundary of the current block. The device further includes a filtering module configured to, in response to the determining module determining to apply filtering to both the top boundary and the left boundary of the current block: filter a first sample located in a top-left area of the current block using (i) at least one sample from the upper block above the top-left area of the current block, (ii) at least one sample from the left block to the left of the top-left area of the current block, and (iii) at least one unfiltered sample value for the first sample; filter a second sample located in a top-right area of the current block using (i) at least one sample from the upper block above the top-right area of the current block and (ii) at least one unfiltered sample value for the second sample; and filter a third sample located in a bottom-left area of the current block using (i) at least one sample from the left block to the left of the bottom-left area of the current block and (ii) at least one unfiltered sample value for the third sample.

According to a fourth aspect, a computer program, comprising instructions which, when executed on at least one processor, causes the at least one processor to carry out the method according to any one of the embodiments of the first aspect is provided.

According to a fifth aspect, a carrier comprising the computer program of the fourth aspect is provided. The carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
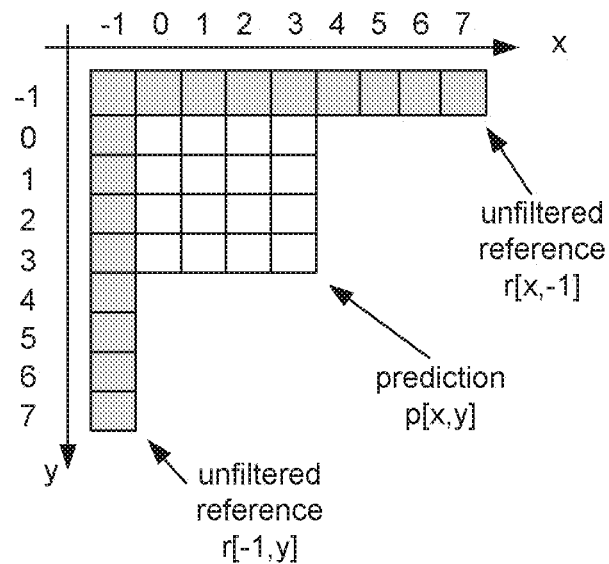
FIG. 1 illustrates intra prediction in 4×4 blocks, with notation for unfiltered and filtered reference samples.
Figure 1:
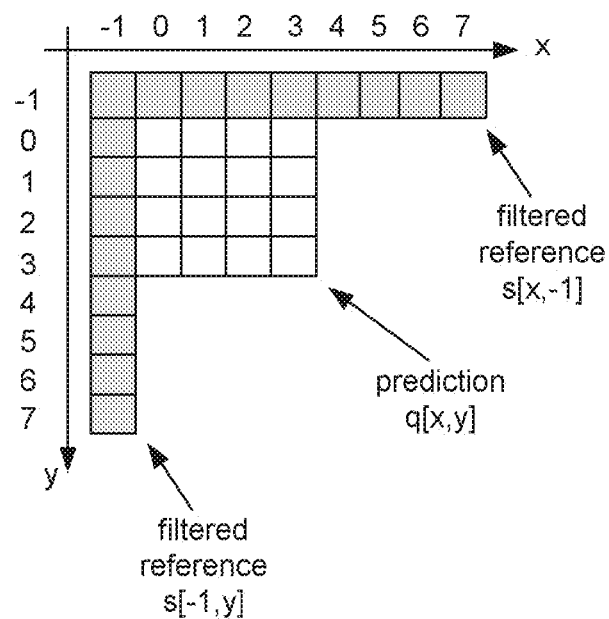
Figure 2:
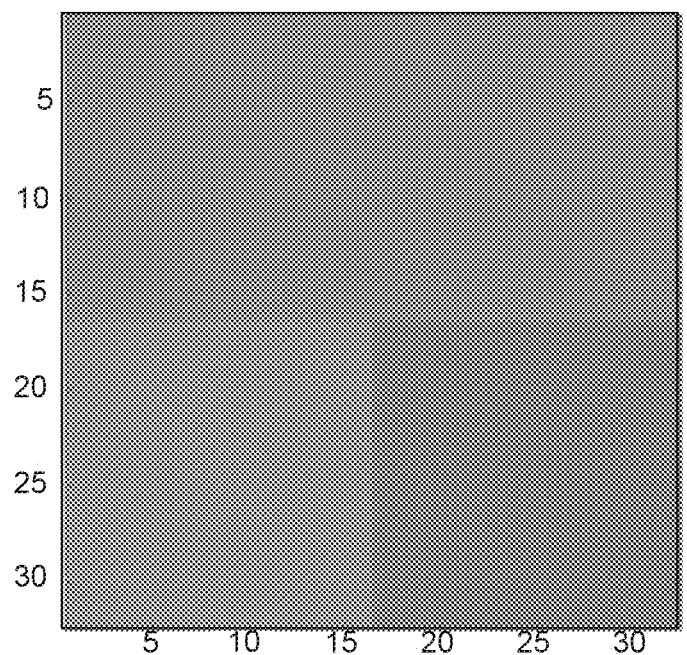
FIG. 2 illustrates a discontinuity between the bottom right block (e.g., current block) and its neighboring blocks.
Figure 3:
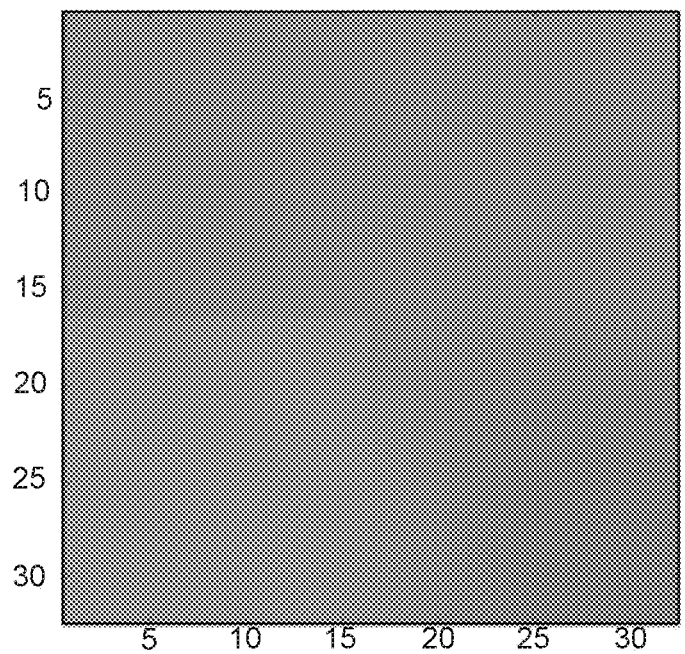
FIG. 3 illustrates the result after filtering that is only done inside the current block to reduce discontinuity first across the left boundary and then the top boundary, according to the related art.
Figure 4:
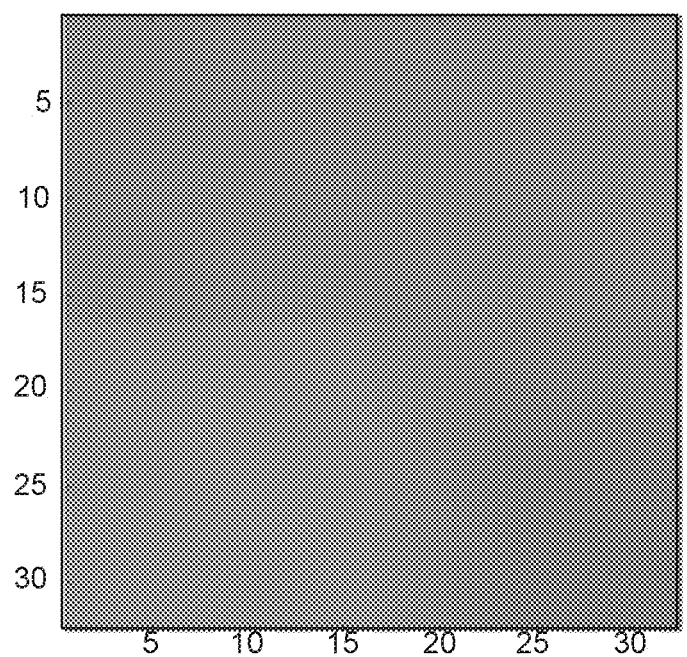
FIG. 4 illustrates filtering according to some embodiments, where filtering is applied in three different areas (e.g., top-left, top-right and bottom-left area) of the current block.

It is noted that first applying a filter to smooth the edge across a vertical boundary and then using the same or a similar filter to smooth the edge across a horizontal boundary results in a stronger filtering effect in the top left area of the current block. This stronger filtering effect is especially noticeable if the image values are more different to the left of the current block than above the current block. FIGS. 2-4 illustrate the problem. For example, FIG. 2 shows a discontinuity between the bottom right block (e.g., current block) and its neighboring blocks, since it is darker. There is a larger discontinuity with the left block since it is brighter than the block above the current block. FIG. 3 shows the result after filtering that is only done inside the current block to reduce discontinuity first across the left boundary and then the top boundary, according to the related art. FIG. 4 shows filtering according to some embodiments, where filtering is applied in three different areas (e.g., top-left, top-right and bottom-left area) of the current block as indicated in FIG. 5.

Figure 5:
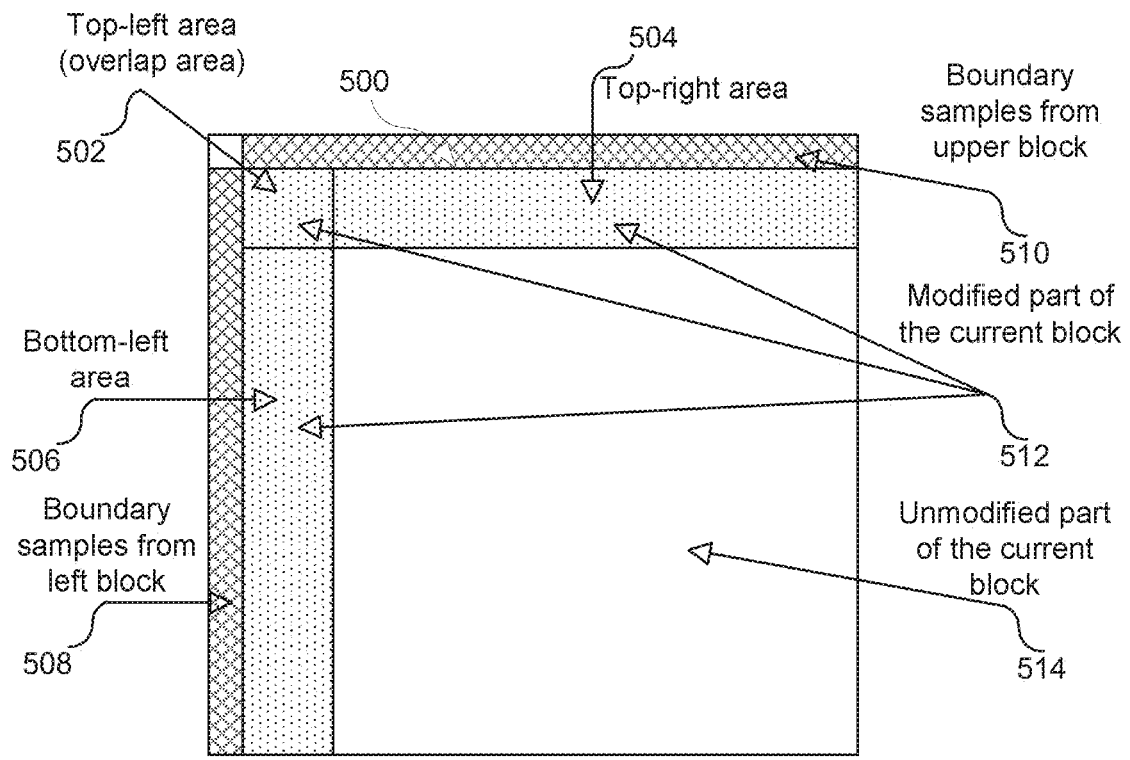
FIG. 5 illustrates filtering of a block according to some embodiments.

FIG. 5 shows a current block 500 that has been divided into three regions. The block is divided into a top-left area 502, a top-right area 504, and a bottom-left area 506. Left block 508 represents a block to the left of the current block 500, and upper block 510 represents a block above the current block 500. In embodiments, samples from blocks 508 and 510 may be used in filtering of the current block 500. As shown, there is an upper boundary region and a left boundary region, which overlap at the top-left area 502. The upper boundary region consists of top-left area 502 and top-right area 504 and is also called the top boundary. The left boundary region consists of top-left area 502 and bottom-left area 506 and is also called the left boundary. These represent regions 512 of the current block that are modified by the filtering of various embodiments. Outside of the boundary region is an unmodified region 514 of the block.

Figure 6:
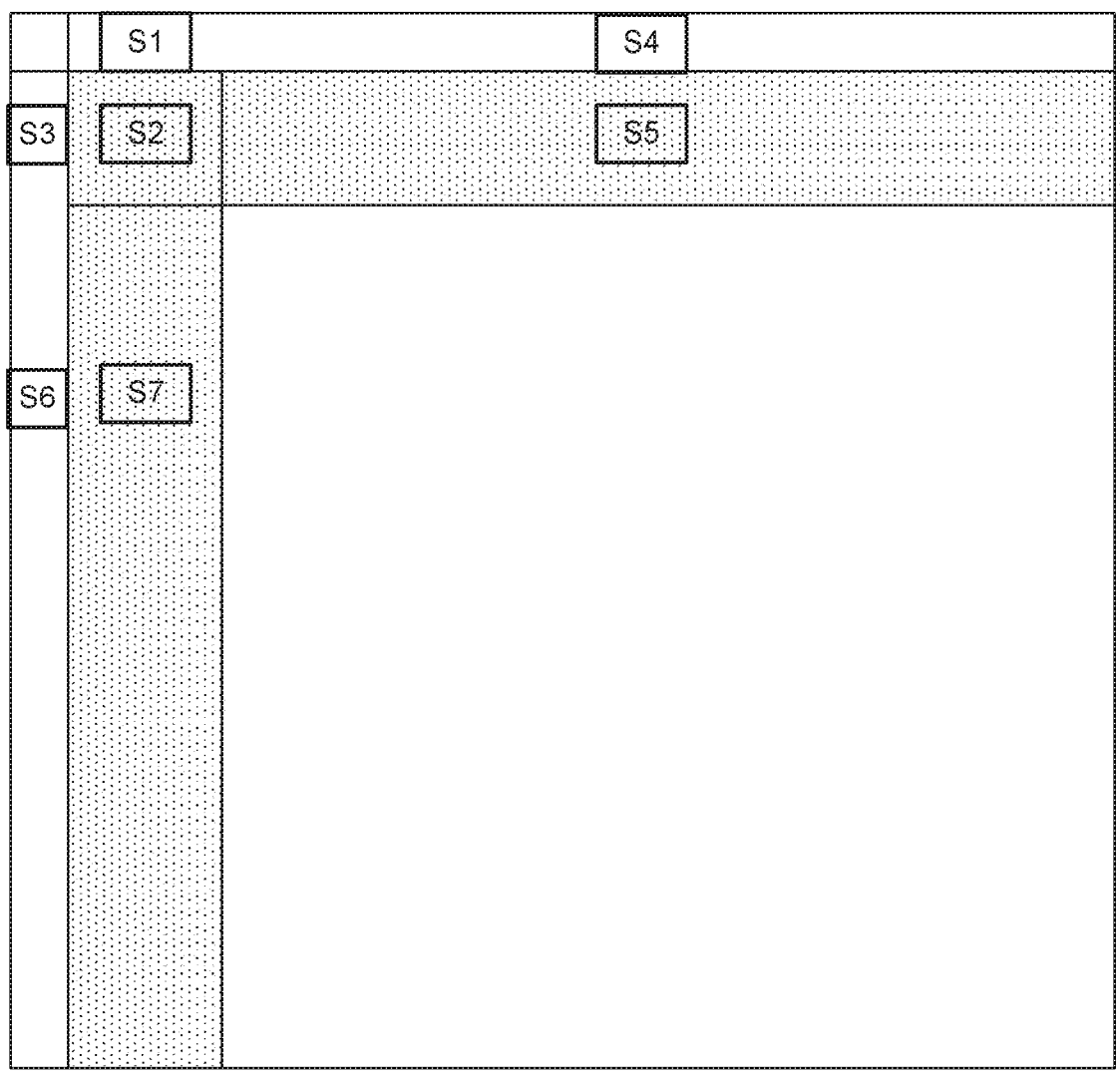
FIG. 6 illustrates filtering of a block according to some embodiments.

FIG. 6 shows a current block. As shown, there are samples S2, S5, and S7 in the current block; samples S1 and S4 in the upper block; and samples S3 and S6 in the left block. Sample S1 is located above sample S2, and sample S3 is located to the left of sample S2. Sample S4 is located above sample S5. Sample S6 is located to the left of sample S7.

Embodiments may be described with reference to FIGS. 5-6.

In some embodiments, a method is provided that includes determining if both the top and the left boundary of current block need to be filtered. If so, then filtering is applied to the top-left, top-right, and bottom-left areas of the current block as follows. The top-left area of the current block is filtered by using at least one sample (e.g., S1 in FIG. 6) above the sample (e.g., S2) to filter in current block, where the above sample (S1) comes from a block above the current block; at least one sample (e.g., S3) left of the sample (S2) to filter in current block where the left sample (S3) comes from a block left of current block; and at least the unfiltered sample (S2) to filter comes from the current block. The top-right area of the current block is filtered by using at least one sample (e.g., S4) above the sample (e.g., S5) to filter in current block, where the above sample (S4) comes from a block above of the current block; and at least the unfiltered sample (S5) to filter comes from the current block. The bottom-left area of the current block is filtered by using at least one sample (e.g., S6) left of the sample (e.g., S7) to filter in current block where the left sample (S6) comes from a block left of the current block; and at least the unfiltered sample (S7) to filter comes from the current block.

In some embodiments (for example, as described above) the current block may be divided into three different boundary regions to be filtered, e.g., a top-left area, a top-right area, and a bottom-left area; and the regions may then be filtered separately, e.g. when it is desired to filter both a top and left boundary of the current block. The top-left area is here also called the overlap area, because it is common to both the top boundary and the left boundary of the current block. This may also be viewed as having a top boundary region and a left boundary region, where the top-left area is the overlap area between the left and top boundary regions. In embodiments, the boundary regions to be filtered are less than the whole of the current block, i.e. there is a non-empty unmodified part of the current block. In some embodiments, the boundary regions are on the order of several samples (e.g., for the left boundary region, several samples wide; for the top boundary region, several samples high). Increasing the size of the boundary regions (e.g., the width or height) increases the complexity of the filtering operation. The size may be selected, for example, based on a desired complexity, the size of the current block (e.g., larger blocks may benefit from larger boundary regions), and the level of continuity between the blocks (e.g., if the left block and the current block are discontinuous, a larger boundary region may be beneficial). Other divisions of the block into different regions are also possible (for example, having a bottom boundary region and a right boundary region).

Embodiments may be used in both an encoder and a decoder.

The top-left area of the block may be filtered using (i) at least one sample from an upper block that is positioned vertically above the sample in the current block to be filtered; (ii) at least one sample from a left block that is positioned horizontally left to the sample in the current block to be filtered; and (iii) at least one sample in the current block, to modify a sample in the current block. The top-right area may be filtered using (i) at least one sample from an upper block that is positioned vertically above the sample in the current block to be filtered and (ii) at least one sample in the current block to modify a sample in the current block. The bottom-left area may be filtered using (i) at least one sample from the left block that is positioned horizontally left of the sample in the current block to be filtered and (ii) at least one sample in the current block to modify a sample in the current block. While at least one sample in each of the top-left, top-right, and bottom-left areas may be filtered, in some embodiments more than one sample is filtered, e.g., half of the samples, all the samples, or any other number of the samples.

One design consideration with such filtering is to provide for a smooth transition from filtering in the overlap area (e.g., top-left area) and the non-overlap areas (e.g., top-right area and bottom-left area). One way, for example, for providing for a smooth transition is by designing the filter for the overlap area such that it resembles the filter in the top-right area with a decay (e.g., linear decay) based on increasing distance from the left block and that it resembles the filter in the bottom-left area with a decay (e.g., linear decay) based on increasing distance from the upper block.

Embodiments provide for a filter strength that decays (e.g., decays linearly) with distance from a block boundary, for example based on a distance measured in number of samples. For example, consider samples across a vertical boundary for filtering of a row of the bottom-left area of a current block where four samples are filtered: [R $a_0$ $a_1$ $a_2$ $a_3$], where R is a sample from a neighboring reconstructed block not to be filtered and $a_0$ to $a_3$ are predicted, adjacent samples of the current block. In this example, the filter coefficients to filter this row may be derived (in some embodiments) from a desired strength of the filtering on sample $a_0$ and then the filter strength can decay linearly with the distance from R. One example is to have a filter coefficient of 0.5 for the samples $a_0$ and R. Setting the filter to the vector f=[32, 64, 96, 128]/256, we can compute $a(x)'=R*f(-x+3)+(1-f(-x+3))*a(x)$, where $a(x)'$ is a filtered version of $a(x)$ and x is from 0 to 3, where $a(0)=a_0$, $a(1)=a_1$ and generally $a(n)=a_n$. Other regions (e.g., the bottom left region or top-right region of the current block) may similarly be filtered based on a filter strength that decays, such as by a linear decay. When filtering, e.g., a top-right region, the adjacent samples $a_0$ to $a_3$ are located vertically, while for e.g., a bottom-left region, the adjacent samples $a_0$ to $a_3$ are located horizontally.

Another example of filter coefficients when filtering four samples with a non-linear decay is to have a decay of 0.5, 0.25, 0.125, 0.0625, or more generally, for a distance n from a boundary, having a decay factor of $2^{-n}$. The filter coefficients may then become the vector f=[16, 32, 64, 128]/256. To a sample at a specific row and column in the top-left area in the current block, both a sample from the block above (here called $R_{above}$) and a sample from the block to the left (here called $R_{left}$) are used in addition to a sample in the top-left area of the current block. The filtered value then becomes:

$$a(x,y)'=R_{above}*f_1(x,y)+R_{left}*f_2(x,y)+a(x,y)*(1-f_1(x,y)-f_2(x,y)),$$

where $a(x,y)'$ is a filtered version of $a(x,y)$; x is from 0 to N−1 and y is from 0 to M−1, where N is the width of the top-left area and M is the height of the top-left area; $f_1(x,y)$ is a filter coefficient to be applied on the sample from the block above and $f_2(x,y)$ is a filter coefficient to be applied on the sample from the block to the left.

One example on how to define filters to use for the top-left area is to use the filters for the non-overlap area first in the horizontal direction and then in the vertical direction using a value of 0 for all samples of the current block and a value of 1 for all samples of neighboring blocks. The output of that filtering will then show a smooth decay of the output values further away from the upper and left block boundaries, something that also is beneficial to have for the filtering of the top-left area.

If the same filter coefficients are applied in the vertical direction as in the horizontal direction, then it is sufficient to determine one set of initial one-dimensional (1D) filter coefficients and one set of 1D offset coefficients. The offset coefficients are used to update the 1D filter coefficients according to the distance from the boundary to get desired two-dimensional (2D) filter coefficients for $f_1$ and $f_2$. For example, we can define $f_1(x,y)=f_{init}(x)+x*f_{offset}(x)$ and $f_2(x,y)=f_{init}(y)+y*f_{offset}(y)$. In this example, the top coefficients ($f_1(x,y)$) may be increased when the column increases, in order to put emphasis on the top sample ($R_{above}$), and the left coefficients ($f_2(x,y)$) may be increased when the row increases, in order to put emphasis on left sample ($R_{left}$).

An example, according to some embodiments, of the filtering process is now described. For exemplary purposes, pseudo-code is provided below, though it is noted that it is meant to show an exemplary algorithm, and that other algorithms, and other manners of implementing the exemplary algorithm, are possible. As shown, the pseudo-code provides for performing filtering of the top-right area, the top-left area, and the bottom-left area with fixed point arithmetic where floating point coefficients are rounded to integers after multiplication of a scale factor (e.g., ParScale).

The filtering of the top-left area can be described as follows where theFilter1 is a vector of the initial filter coefficients, theOffset is a vector of the offset coefficients, numSamps is the number of samples from the border to filter, iHeight is the height of the current block, iWidth is the width of the current block (pDst), and uiStride is a positive stride value. ParScale corresponds to the maximum value of a filter coefficient; ParOffset corresponds to a rounding factor; and ParShift corresponds to a right shift factor typically used in fixed point implementations as an approximate of a division (x/64=x>>ParShift where ParShift is 6). piRefVector is a vector of reference samples, e.g. sample values outside the current block (left and/or upper block), for example samples that have been filtered before they are used here. ClipA is a clipping function to make sure that the filtered value stays within an allowed range; compID corresponds to a luma or a chroma component.

```
// filter top left region
for (Int nr=0; nr<numSamps;nr++)
{
    tmpFilter[nr] = theFilter1[nr];
}
    for (Int row = 0; row < min(numSamps,iHeight); row++)
    {
        Int pos      = row * uiStride;
        Int Coeff_Top   = theFilter1[numSamps-row-1];
        for (Int col = 0; col < min(numSamps,iWidth); col++, pos++)
        {
            Int Coeff_Left    = tmpFilter[numSamps-col-1];
            Int TmpCoeff_Top = Coeff_Top;
            Int Coeff_Cur     = ParScale - Coeff_Left - TmpCoeff_Top;
            Int sampleVal = (Coeff_Left* piRefVector[-row - 1] + TmpCoeff_Top
* piRefVector[col + 1]   + Coeff_Cur * pDst[pos] + ParOffset) >> ParShift;
            pDst[pos] = ClipA(sampleVal,compID);
            // update filter coefficient for the sample of the left block
            // such that the updated coefficient is used for the next row
            tmpFilter[numSamps-col-1] += theOffset[numSamps-col-1];
            // update filter coefficient for sample of the above block
            // such that the updated coefficient is used for the next column
            Coeff_Top += theOffset[numSamps-row-1];
        }
    }
```

In some cases, such as when the filter in the top-left area gives a smooth transition with the top-right and the bottom-left areas, the filter coefficients do not need to be modified with a decay based on increasing distance from the left and the upper block and the filtering for the top-left area can be described as follows:

```
// filter top left region
for (Int row = 0; row < min(numSamps,iHeight); row++)
{
    Int pos    = row * uiStride;
    Int Coeff_Top   = theFilter1[numSamps-row-1];
    for (Int col = 0; col < min(numSamps,iWidth); col++, pos++)
    {
        Int Coeff_Left   = theFilter1[numSamps-col-1];
        Int TmpCoeff_Top = Coeff_Top;
        Int Coeff_Cur    = ParScale - Coeff_Left - TmpCoeff_Top;
        Int sampleVal = (Coeff_Left* piRefVector[-row - 1] + TmpCoeff_Top
* piRefVector[col +  1] + Coeff_Cur * pDst[pos] + ParOffset) >> ParShift;
        pDst[pos] = ClipA(sampleVal,compID);
    }
}
```

In some embodiments the top right region is filtered with theFilter2 and can be described as follows:

```
// filter top right region
if(iWidth > numSamps)
    Int posOffset = numSamps;
for (Int row = 0; row < min(numSamps,iHeight); row++)
{
    Int pos    = row * uiStride + posOffset;
    Int Coeff_Top   = theFilter2[numSamps-row-1];
        for (Int col = numSamps; col < iWidth; col++, pos++)
        {
            Int Coeff_Cur    = ParScale - Coeff_Top;
            Int sampleVal = (Coeff_Top * piRefVector[col + 1]   + Coeff_Cur
* pDst[pos] + ParOffset) >> ParShift;
            pDst[pos] = ClipA(sampleVal,compID);
        }
    }
}
```

In some embodiments the top right region is filtered with theFilter2 and can be described as follows:

```
// filter bottom left region
if(iHeight > numSamps)
{
    for (Int row = numSamps; row < iHeight; row++)
    {
        Int pos    = row * uiStride;
        for (Int col = 0; col < min(numSamps,iWidth); col++, pos++)
        {
            Int Coeff_Left  = theFilter2[numSamps-col-1];
            Int Coeff_Cur   = ParScale - Coeff_Left;
            Int sampleVal = (Coeff_Left* piRefVector[-row - 1] + Coeff_Cur
* pDst[pos] + ParOffset) >> ParShift;
            pDst[pos] = ClipA(sampleVal,CompID);
        }
    }
}
```

Filtering according to the various embodiments disclosed herein may be applied on a prediction block as part of an intra prediction process. As one example, such filtering may be applied together with the DC or the planar prediction mode. For example, filter coefficients when the current block is using planar prediction are now provided. When the width or height of the prediction block is less than eight samples, a two-sample wide border is filtered using filter coefficients for the overlap area called theFilter1 and filter coefficients called theFilter2 for the non-overlap areas. No offset coefficients are used in this example. The variables ParShift is set to 8 and ParOffset is set to $(1<<(8-1))=128$. The filters are described by theFilter1[2]={64, 118}; and theFilter2[2]={64, 128}.

For other larger block sizes, a four-sample wide border is filtered using other filter coefficients for the overlap area (theFilter1) and for the non-overlap area (theFilter2). No offset coefficients are used. We here use a denominator of 256, i.e. $(1<<8)=256$. The filters are described by theFilter1[4]={32, 58, 88, 118}; and theFilter2[4]={32, 64, 96, 128}.

The following table illustrates the filter coefficients for Coeff_Left/Coeff_Top/Coeff_Curr for a N×M current block. Coeff_Top is the transpose of Coeff_Left. The sum of all coefficients is 256.

TABLE 1

|             | Column = 0 | Column = 1 | Column = 2 | Column = 3 | Column = 4 to M |
|---|---|---|---|---|---|
| Row = 0     | 118/118/20 | 88/127/41  | 58/136/62  | 32/145/79  | 0/128/128 |
| Row = 1     | 127/88/41  | 95/95/66   | 63/102/91  | 35/109/112 | 0/96/160  |
| Row = 2     | 136/58/62  | 102/63/91  | 68/68/120  | 38/73/145  | 0/64/192  |
| Row = 3     | 145/32/79  | 109/35/112 | 73/38/145  | 41/41/174  | 0/32/224  |
| Row = 4 to N| 128/0/128  | 96/0/160   | 64/0/192   | 32/0/224   | 0/0/256   |

Here is an example of filter coefficients when the current block is a DC predicted block:

When the block size is greater than or equal to 32×32, or when quadtree plus binary tree (QTBT) structures are used and the minimum of width and height is greater than or equal to 32, the boundary filtering may be designed to filter 7 samples inside the current block. For the overlap area, the modified current sample (Current) is derived by (Coeff_Left*refSampleLeft+Coeff_Above*refSampleAbove+Coeff_Current*Current)>>ParShift, where e.g. refSampleLeft and refSampleAbove refer to left and upper reference samples respectively. For the bottom-left non-overlap area, the modified current sample (Current) is derived by (Coeff_Left*refSampleLeft+Coeff_Current*Current)>>ParShift. For the top-right non-overlap area, the modified current sample (Current) is derived by (Coeff_Above*refSampleAbove+Coeff_Current*Current)>>ParShift. In this example, the ParShift variable is set to 8. The filter coefficients for overlap area are stored in the array theFilter1. The filter coefficients for the non-overlap areas are stored in the array theFilter2. The filter offsets are stored in the array theOffset. These vectors may be described by: theFilter1[7]={2, 24, 46, 64, 82, 104, 126}; theFilter2[7]={16, 32, 48, 64, 80, 96, 112}; and theOffset [7]={2, 2, 2, 2, 2, 2, 1}.

The following table shows the filter coefficients for each sample in a 32×32 block. The filter coefficients for each sample are Coeff_Left/Coeff_Above/Coeff_Current.

TABLE 2

|  | column 0 | column 1 | column 2 | column 3 | column 4 | column 5 | column 6 | column 7 to column 31 |
|---|---|---|---|---|---|---|---|---|
| row 0 | 126/126/4 | 104/127/25 | 82/128/46 | 64/129/63 | 46/130/80 | 24/131/101 | 2/132/122 | 0/112/144 |
| row 1 | 127/104/25 | 106/106/44 | 84/108/64 | 66/110/80 | 48/112/96 | 26/114/116 | 4/116/136 | 0/96/160 |
| row 2 | 128/82/46 | 108/84/64 | 86/86/84 | 68/88/100 | 50/90/116 | 28/92/136 | 6/94/156 | 0/80/176 |
| row 3 | 129/64/63 | 110/66/80 | 88/68/100 | 70/70/116 | 52/72/132 | 30/74/152 | 8/76/172 | 0/64/192 |
| row 4 | 130/46/80 | 112/48/96 | 90/50/116 | 72/52/132 | 54/54/148 | 32/56/168 | 10/58/188 | 0/48/208 |
| row 5 | 131/24/101 | 114/26/116 | 92/28/136 | 74/30/152 | 56/32/168 | 34/34/188 | 12/36/208 | 0/32/224 |
| row 6 | 132/2/122 | 116/4/136 | 94/6/156 | 76/8/172 | 58/10/188 | 36/12/208 | 14/14/228 | 0/16/140 |
| row 7 to row 31 | 112/0/144 | 96/0/160 | 80/0/176 | 64/0/192 | 48/0/208 | 32/0/224 | 16/0/140 | 0/0/256 |

In some embodiments, the length of boundary filter coefficients for large blocks may be increased, for example, for block sizes larger than 32×32, and then more filter coefficients may be used. This will result in better linear decay inside the block. But it will also increase the computational complexity. To achieve a good balance between filtering results and complexity, the length of the filter could vary depending on the size of the block. For a QTBT structure, for example, the length of the filter could vary depending on the width and height of the block or the minimum of the width and height of the block.

In some embodiments, the filter coefficients may be designed to put more weight on values from neighboring blocks or more weight on values from the current block. We call the filter that puts more weight on neighboring blocks a "strong filter", and call the filter that puts more weight on the current block a "weak filter". The selection between using the strong filter or the weak filter could be based on signaling a one-bit flag in the bit stream or could be achieved by checking a condition such as: whether neighboring blocks signals residual coefficients in the bit stream or whether the current block is using a non-separable secondary transform (NSST) or not. The selection between using a "strong filter" or a "weak filter" can alternatively be based on the Quantization Parameter, QP, such that a strong filter is used for higher QPs than for lower QPs. Combinations of filter selection criteria can be used.

Filtering according to the various embodiments disclosed herein may be applied, in some examples, where the current block is a reconstructed block, including where such filtering is applied as part of deblocking left and top boundaries of the reconstructed block at the same time.

Figure 7:
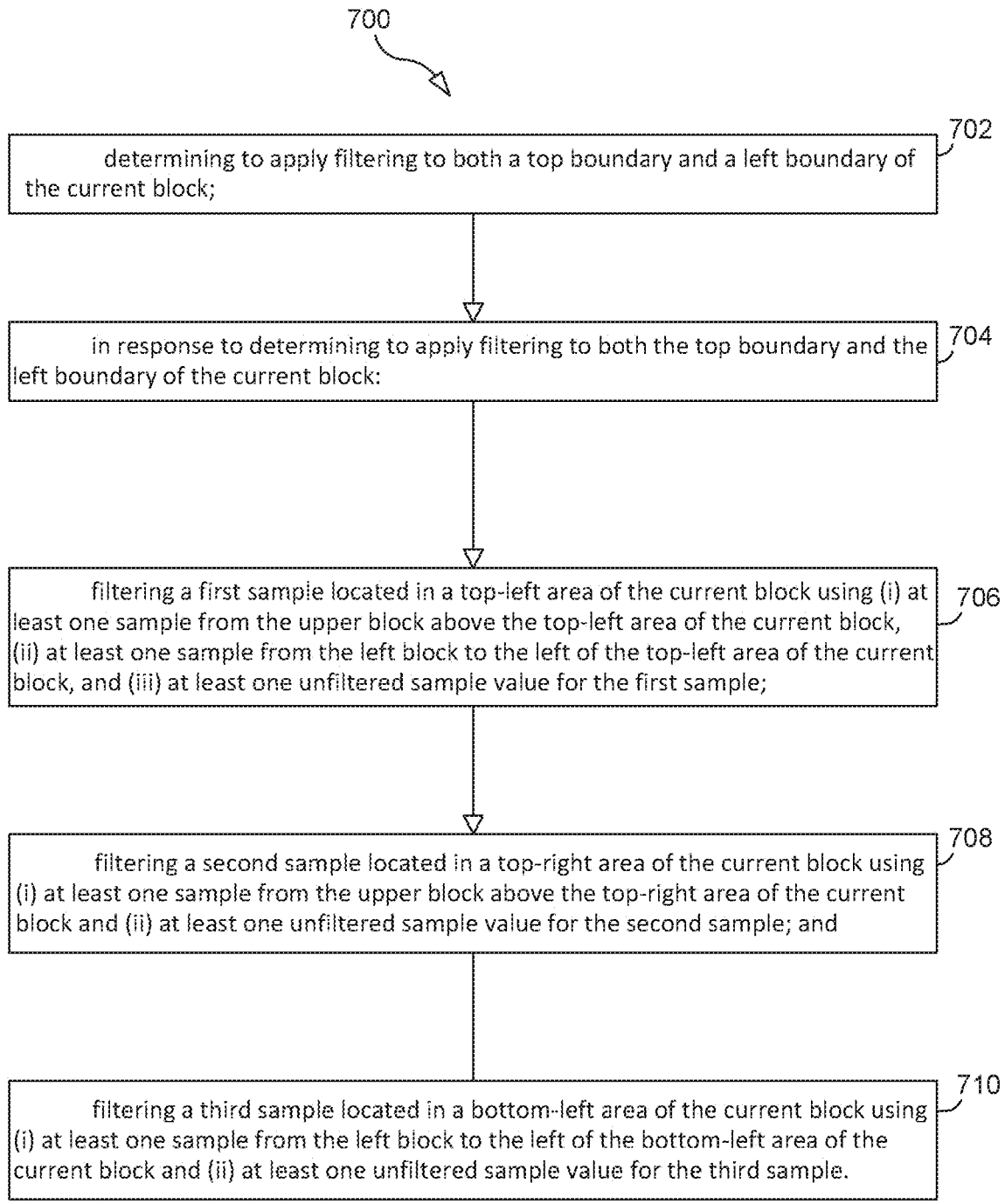
FIG. 7 illustrates a flow chart according to some embodiments.

Referring now to FIG. 7, process 700 describes a method performed by a device (e.g., encoder, decoder) for filtering a current block adjacent to an upper block and a left block. The method includes determining to apply filtering to both a top boundary and a left boundary of the current block (step 702). The method further includes, in response to determining to apply filtering to both the top boundary and the left boundary of the current block (step 704): filtering a first sample located in a top-left area of the current block using (i) at least one sample from the upper block above the top-left area of the current block, (ii) at least one sample from the left block to the left of the top-left area of the current block, and (iii) at least one unfiltered sample value for the first sample (step 706); filtering a second sample located in a top-right area of the current block using (i) at least one sample from the upper block above the top-right area of the current block and (ii) at least one unfiltered sample value for the second sample (step 708); and filtering a third sample located in a bottom-left area of the current block using (i) at least one sample from the left block to the left of the bottom-left area of the current block and (ii) at least one unfiltered sample value for the third sample (step 710).

In some embodiments, the samples from the upper block and/or from the left block are taken from the respective boundaries of those blocks, e.g. within a few pixels of the respective boundaries.

In embodiments, filtering samples in the top-left, top-right, and bottom-left areas of the current block is performed such that there is a smooth transition from filtering in the top-left area of the current block (e.g., overlap area) and the top-right and bottom-left areas of the current block (e.g., non-overlap areas), such that filtering the first sample in the top-left area of the current block is based on (i) filtering performed in the bottom-left area of the current block and a distance of the first sample from the bottom-left area of the current block, and (ii) filtering performed in the top-right area of the current block and a distance of the first sample from the top-right area of the current block. In embodiments, filtering samples in the top-left, top-right, and bottom-left areas of the current block results in a linear decay with distance from a block boundary. In embodiments, filter coefficients decay as $2^{-d}$ for a distance d from a vertical or horizontal boundary. In embodiments, the current block is a prediction block and/or the current block uses planar prediction or DC prediction, and determining to apply filtering to both a top boundary and a left boundary of the current block is based at least in part on the current block being a prediction block and/or the use of planar prediction or DC prediction. In embodiments, the method further includes selecting between a strong filter and a weak filter based on whether neighboring blocks comprise residual coefficients and/or whether the current block is using a non-separable secondary transform (NSST). In embodiments, the current block is a prediction block and the filtering the top-left, top-right, and bottom-left areas of the current block is applied on the current block as part of an intra prediction process, and determining to apply filtering to both a top boundary and a left boundary of the current block is based at least in part on the intra prediction process.

In embodiments, a strong filter comprises a filter that puts more weight on values of neighboring blocks, and a weak filter comprises a filter that puts more weight on values of the current block. In embodiments, one or more of: (i) the at least one sample from the upper block above the top-left area of the current block and the at least one unfiltered sample value for the first sample are located in the same sample column; (ii) the at least one sample from the left block to the left of the top-left area of the current block and the at least one unfiltered sample value for the first sample are located in the same sample row; (iii) the at least one sample from the upper block above the top-right area of the current block and the at least one unfiltered sample value for the second sample are located in the same sample column; and (iv) the at least one sample from the left block to the left of the bottom-left area of the current block and the at least one unfiltered sample value for the third sample are located in the same sample row.

In some embodiments, filtering samples in the top-left, top-right, and bottom-left areas of the current block is performed such that there is a smooth transition from filtering in the top-left area of the current block (e.g., overlap area) and the top-right and bottom-left areas of the current block (e.g., non-overlap areas). The method further comprises filtering additional samples from the top-left area, filtering additional samples from the top-right area, and filtering additional samples from the bottom-left area: (1) such that filter coefficients for filtering the first sample and the additional samples from the top-left area of the current block are closer to filter coefficients for filtering the second sample and the additional samples from the top-right area of the current block for samples closer to the boundary between the top-left and top-right areas of the current block, and (2) such that filter coefficients for filtering the first sample and the additional samples from the top-left area of the current block are closer to filter coefficients for filtering the third sample and the additional samples from the bottom-left area of the current block for samples closer to the boundary between the top-left and bottom-left areas of the current block.

Example results are now provided. In video coding standardization it is common practice to use a fixed set of test sequences with different characteristics for evaluation of the performance of different methods. In this case, the test classes corresponds to test sequences used in JVET and they correspond to test sequences with different resolutions where A correspond to 4K test sequences, B to 1080p test sequences, E to 720p test sequences, C to 832×480 test sequences and D to 416×240 test sequences.

The BD rate tells you what reduction in bitrate that a test method may have in comparison with a reference method when both methods results in the same quality. In the example, the quality is measured in PSNR which is an abbreviation for Peak-Signal-to-Noise Ratio and is defined as $10*\log_{10}((2^{bit\_depth}-1)^2/(MSE))$, where MSE is Mean Squared Error between the source video and a video after compression.

One result of filtering according to various embodiments is that block boundaries can have a similar effect at the top-left area of a block as at a top-right area and a bottom-left area of a block. The results in the table below come from applying filtering for intra DC prediction in JEM, using coefficients from table 2. The BD rate performance compared to JEM intra DC boundary smoothing for all intra configuration is as follows:

|  | Y | U | V |
|---|---|---|---|
| Class A1 | −0.13% | −0.29% | −0.25% |
| Class A2 | −0.08% | −0.29% | −0.25% |
| Class B | −0.11% | −0.28% | −0.27% |
| Class C | 0.00% | −0.11% | 0.00% |
| Class D | −0.01% | −0.07% | −0.06% |
| Class E | −0.06% | −0.11% | −0.25% |
| Overall | −0.07% | −0.20% | −0.18% |
| Class F (optional) | −0.01% | −0.07% | 0.06% |

The results in the table below come from applying filtering for intra planar prediction, instead of PDPC planar, using coefficients from table 1. In this example, the boundary filtering is applied to at most a 4-sample wide left and top border of the prediction block, whereas PDPC planar filters all samples of the whole prediction block. The BD rate performance for random access configuration is as follows:

|  | Y | U | V |
|---|---|---|---|
| Class A1 | −0.07% | −1.21% | 0.00% |
| Class A2 | 0.14% | −0.13% | −0.49% |
| Class B | 0.00% | 1.11% | 0.94% |
| Class C | 0.07% | 0.41% | 0.38% |
| Class D | −0.07% | −0.41% | −0.31% |
| Class E |  |  |  |
| Overall (Ref) | 0.01% | 0.01% | 0.14% |

The BD rate performance for low delay B configuration is as follows:

|  | Y | U | V |
|---|---|---|---|
| Class B | −0.09% | 0.27% | 0.34% |
| Class C | −0.01% | 0.23% | −0.20% |
| Class D | −0.05% | −0.22% | −1.70% |
| Class E | −0.39% | 0.33% | 1.14% |
| Overall (Ref) | −0.12% | 0.15% | −0.15% |

These results illustrate some of the advantages of applying filtering according to various embodiments disclosed herein. In particular, the testing illustrates objective criteria by which processes according to embodiments are improved compared to related art. Such embodiments are further advantageous in that subjective criteria (e.g., the subjective quality of the resulting video) are improved compared to related art.

Figure 8:
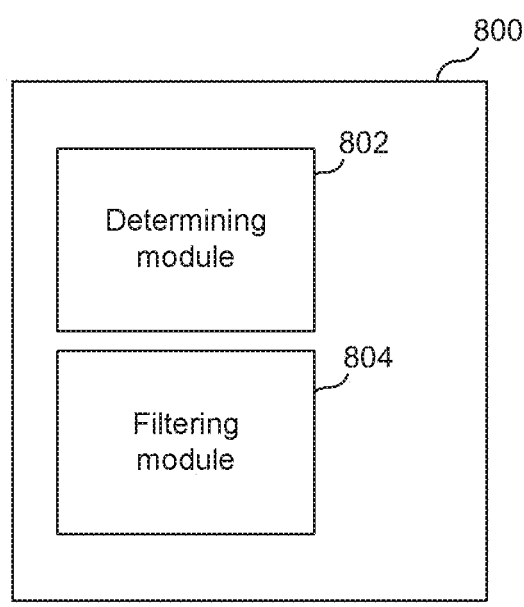
FIG. 8 illustrates a functional diagram of a device (e.g., encoder, decoder) according to some embodiments.

FIG. 8 is a functional diagram of a device 800 (e.g., encoder, decoder). Device 800 includes a determining module 802 and a filtering module 804. Device 800 may be configured for filtering a current block adjacent to an upper block and a left block. The device includes a determining module configured to determine to apply filtering to both a top boundary and a left boundary of the current block. The device further includes a filtering module configured to, in response to the determining module determining to apply filtering to both the top boundary and the left boundary of the current block: filter a first sample located in a top-left area of the current block using (i) at least one sample from the upper block above the top-left area of the current block, (ii) at least one sample from the left block to the left of the top-left area of the current block, and (iii) at least one unfiltered sample value for the first sample; filter a second sample located in a top-right area of the current block using (i) at least one sample from the upper block above the top-right area of the current block and (ii) at least one unfiltered sample value for the second sample; and filter a third sample located in a bottom-left area of the current block using (i) at least one sample from the left block to the left of the bottom-left area of the current block and (ii) at least one unfiltered sample value for the third sample.

Figure 9:
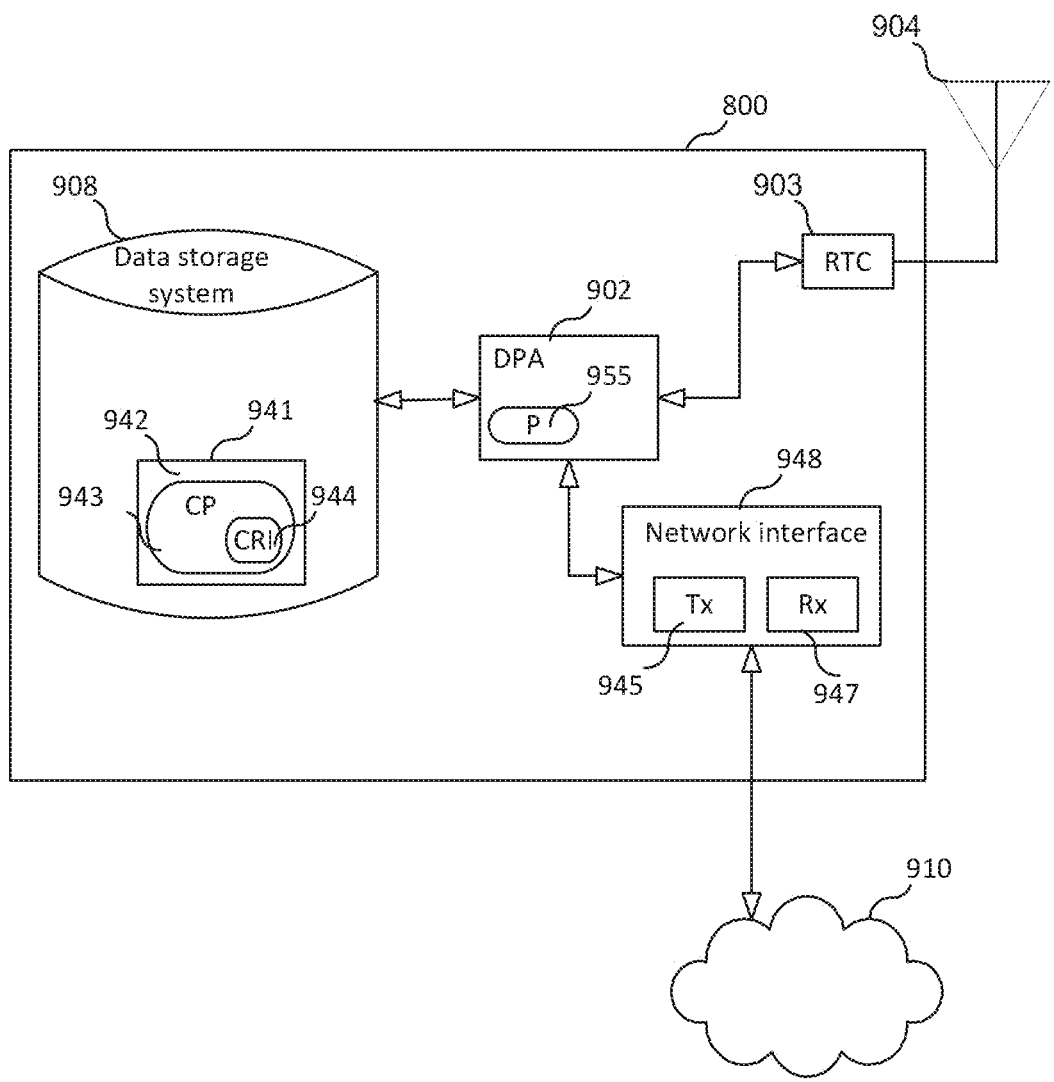
FIG. 9 illustrates a block diagram of a device (e.g., encoder, decoder) according to some embodiments.

FIG. 9 is a block diagram of a device 800 (e.g., encoder, decoder) according to some embodiments. As shown in FIG. 9, device 800 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling device 800 to transmit data to and receive data from other nodes connected to a network 910 (e.g., an Internet Protocol (IP) network) to which network interface 948 is connected; circuitry 903 (e.g., radio transceiver circuitry) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where device 800 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by data processing apparatus 902, the CRI causes device 800 to perform steps described above (e.g., steps described above with reference to the flow charts). In other embodiments, device 800 may be configured to perform steps described herein without the need for code. That is, for example, data processing apparatus 902 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a device for filtering a current block adjacent to an upper block and a left block, the method comprising:

determining to apply filtering to both a top boundary and a left boundary of the current block, wherein the top boundary and left boundary collectively are less than the whole of the current block and filtering is not to be applied to samples of the current block that are outside of the top boundary and left boundary such that there is a non-empty unmodified part of the current block; and in response to determining to apply filtering to both the top boundary and the left boundary of the current block:

filtering a first sample located in a top-left area of the current block using (i) at least one sample from the upper block above the top-left area of the current block, (ii) at least one sample from the left block to the left of the top-left area of the current block, and (iii) at least one unfiltered sample value for the first sample;

filtering a second sample located in a top-right area of the current block using (i) at least one sample from the upper block above the top-right area of the current block and (ii) at least one unfiltered sample value for the second sample; and filtering a third sample located in a bottom-left area of the current block using (i) at least one sample from the left block to the left of the bottom-left area of the current block and (ii) at least one unfiltered sample value for the third sample, wherein the top-left area of the current block comprises samples located in both the top boundary and the left boundary, the top-right area of the current block comprises samples located in the top boundary but not the left boundary, and the bottom-left area of the current block comprises samples located in the left boundary but not the top boundary.

2. The method of claim 1, wherein one or more of: (i) the at least one sample from the upper block above the top-left area of the current block and the at least one unfiltered sample value for the first sample are located in the same sample column; (ii) the at least one sample from the left block to the left of the top-left area of the current block and the at least one unfiltered sample value for the first sample are located in the same sample row; (iii) the at least one sample from the upper block above the top-right area of the current block and the at least one unfiltered sample value for the second sample are located in the same sample column; or (iv) the at least one sample from the left block to the left of the bottom-left area of the current block and the at least one unfiltered sample value for the third sample are located in the same sample row.

3. The method of claim 1, wherein the determining to apply filtering to both a top boundary and a left boundary of the current block is based at least in part on a property of the current block.

4. The method of claim 1, wherein filtering samples in the top-left, top-right, and bottom-left areas of the current block is performed such that there is a smooth transition from filtering in the top-left area of the current block and the top-right and bottom-left areas of the current block, such that filtering the first sample in the top-left area of the current block is based on (i) filtering performed in the bottom-left area of the current block and a distance of the first sample from the bottom-left area of the current block, and (ii) filtering performed in the top-right area of the current block and a distance of the first sample from the top-right area of the current block.

5. The method of claim 1, wherein filtering samples in the top-left, top-right, and bottom-left areas of the current block is performed such that there is a smooth transition from filtering in the top-left area of the current block and the top-right and bottom-left areas of the current block,
wherein the method further comprises filtering additional samples from the top-left area, filtering additional samples from the top-right area, and filtering additional samples from the bottom-left area,
such that filter coefficients for filtering the first sample and the additional samples from the top-left area of the current block are closer to filter coefficients for filtering the second sample and the additional samples from the top-right area of the current block for samples closer to the boundary between the top-left and top-right areas of the current block, and
such that filter coefficients for filtering the first sample and the additional samples from the top-left area of the current block are closer to filter coefficients for filtering the third sample and the additional samples from the bottom-left area of the current block for samples closer to the boundary between the top-left and bottom-left areas of the current block.

6. The method of claim 1, wherein filtering samples in the top-left, top-right, and bottom-left areas of the current block results in a filter strength with linear decay with distance from a block boundary.

7. The method of claim 1, wherein filter coefficients decay as $2^{-d}$ for a distance d from a vertical or horizontal boundary.

8. The method of claim 1, wherein the current block is a prediction block, and wherein the determining to apply filtering to both a top boundary and a left boundary of the current block is based at least in part on the current block being a prediction block.

9. The method of claim 1, wherein the current block uses planar prediction or DC prediction, and wherein the determining to apply filtering to both a top boundary and a left boundary of the current block is based at least in part on the use of planar prediction or DC prediction.

10. The method of claim 1, further comprising selecting between a strong filter and a weak filter based on whether neighboring blocks comprise residual coefficients and/or whether the current block is using a non-separable secondary transform (NSST).

11. The method of claim 1, further comprising selecting between a strong filter and a weak filter based on a Quantization Parameter.

12. The method of claim 1, wherein the current block is a prediction block and the filtering the top-left, top-right, and bottom-left areas of the current block is applied on the current block as part of an intra prediction process, and wherein the determining to apply filtering to both a top boundary and a left boundary of the current block is based at least in part on the intra prediction process.

13. The method of claim 1, wherein the current block is a reconstructed block and the filtering the top-left, top-right, and bottom-left areas of the current block is applied on a reconstructed block as part of a deblocking process, and wherein the determining to apply filtering to both a top boundary and a left boundary of the current block is based at least in part on the deblocking process.

14. The method of claim 10, where a strong filter comprises a filter that puts more weight on values of neighboring blocks, and a weak filter comprises a filter that puts more weight on values of the current block.

15. A device being adapted to perform the steps of claim 1.

16. A computer program product comprising a non-transitory computer readable medium storing a computer program comprising instructions which, when executed on at least one processor, causes the at least one processor to carry out the method of claim 1.

17. A apparatus for filtering a current block adjacent to an upper block and a left block, the apparatus comprising:
a memory; and
a data processing apparatus coupled to the memory and comprising a processor, wherein the data processing apparatus is configured to:
determine whether or not to apply filtering to both a top boundary and a left boundary of the current block, wherein the top boundary and left boundary collectively are less than the whole of the current block and filtering is not to be applied to samples of the current block that are outside of the top boundary and left boundary such that there is a non-empty unmodified part of the current block; and
in response to determining to apply filtering to both the top boundary and the left boundary of the current block:
filter a first sample located in a top-left area of the current block using (i) at least one sample from the upper block above the top-left area of the current block, (ii) at least one sample from the left block to the left of the top-left area of the current block, and (iii) at least one unfiltered sample value for the first sample;
filter a second sample located in a top-right area of the current block using (i) at least one sample from the upper block above the top-right area of the current block and (ii) at least one unfiltered sample value for the second sample; and
filter a third sample located in a bottom-left area of the current block using (i) at least one sample from the left block to the left of the bottom-left area of the current block and (ii) at least one unfiltered sample value for the third sample, wherein
the top-left area of the current block comprises samples located in both the top boundary and the left boundary,
the top-right area of the current block comprises samples located in the top boundary but not the left boundary, and
the bottom-left area of the current block comprises samples located in the left boundary but not the top boundary.

18. The method of claim 1, wherein the top boundary has a first size and the left boundary has a second size, the method further comprising selecting the first size and the second size based on a complexity factor, a size of the current block, and a level of continuity between one or more of (i) the left block and the current block, and (ii) the upper block and current block.

* * * * *